March 29, 1932.  C. O. WALKER ET AL  1,851,472
ALL PURPOSE GATE
Filed Dec. 10, 1930  6 Sheets-Sheet 1
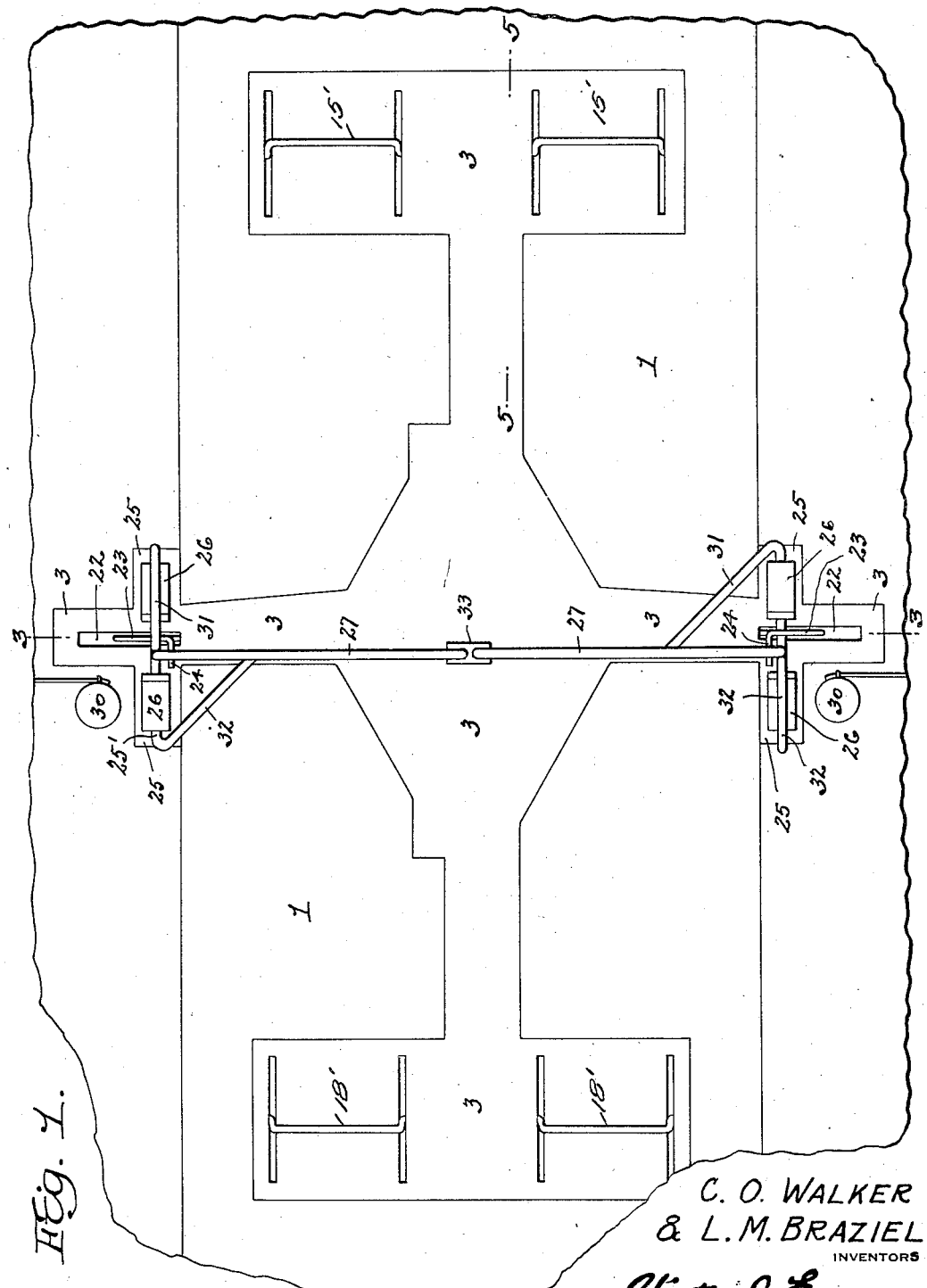
C. O. WALKER
& L. M. BRAZIEL
INVENTORS

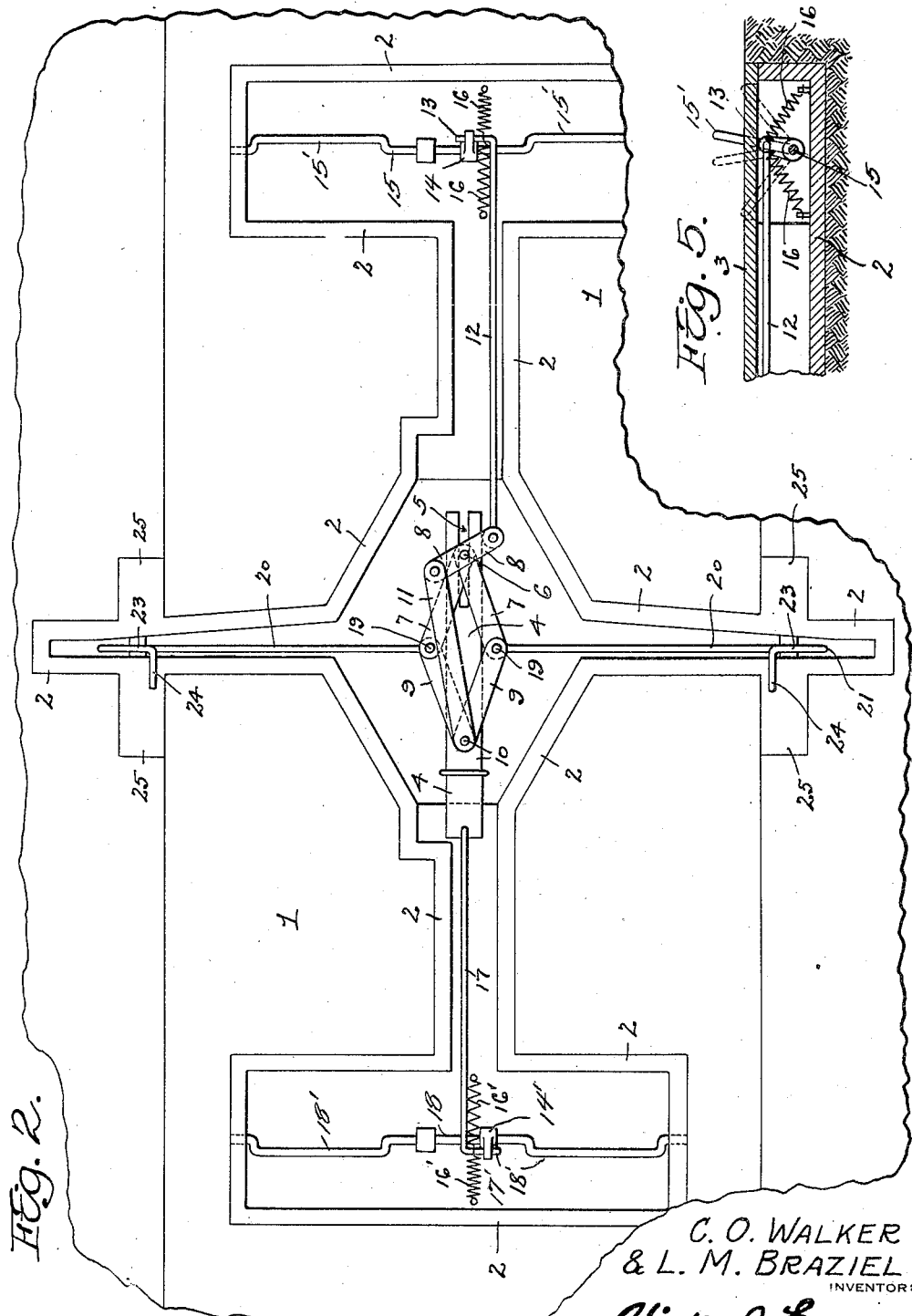

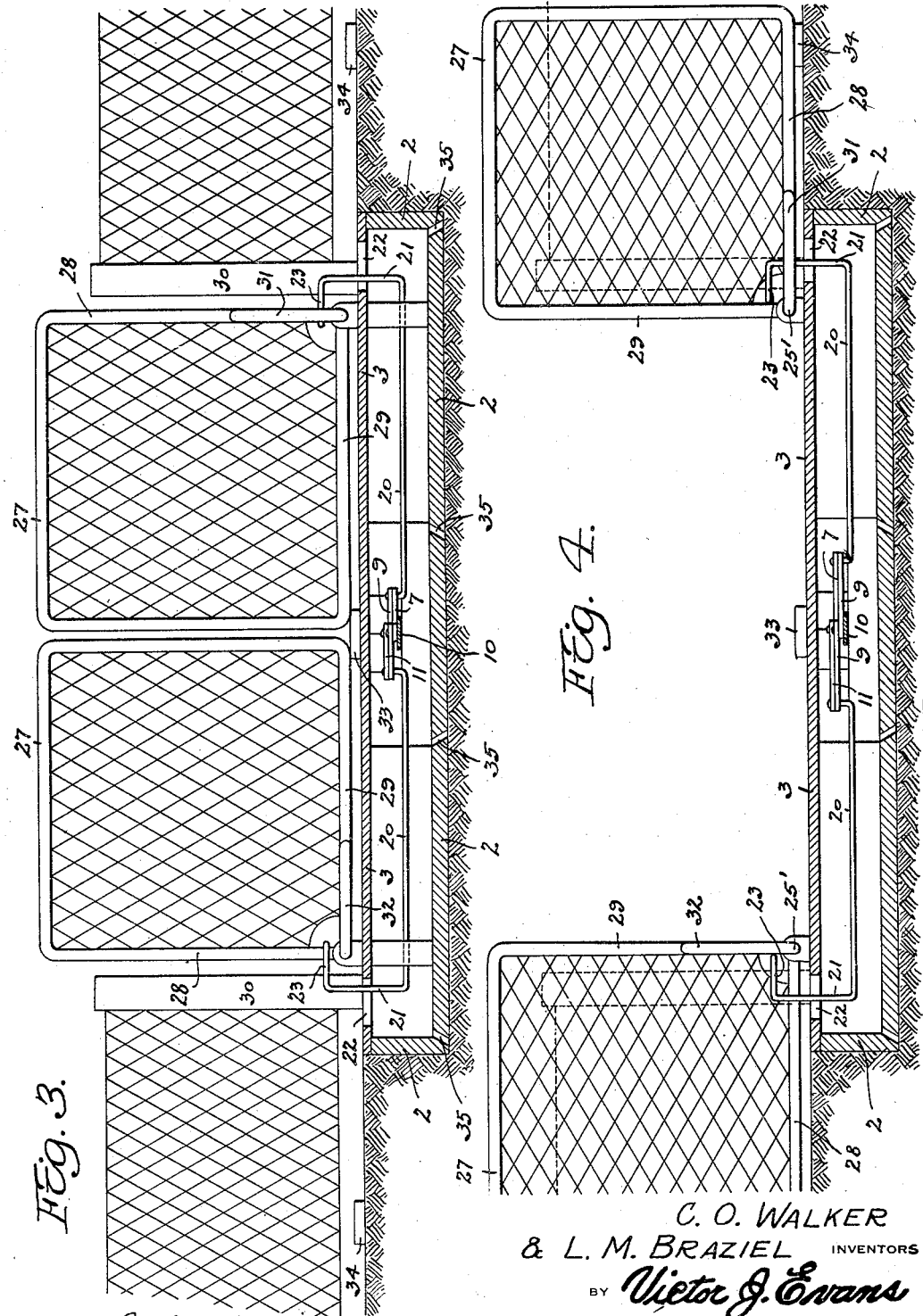

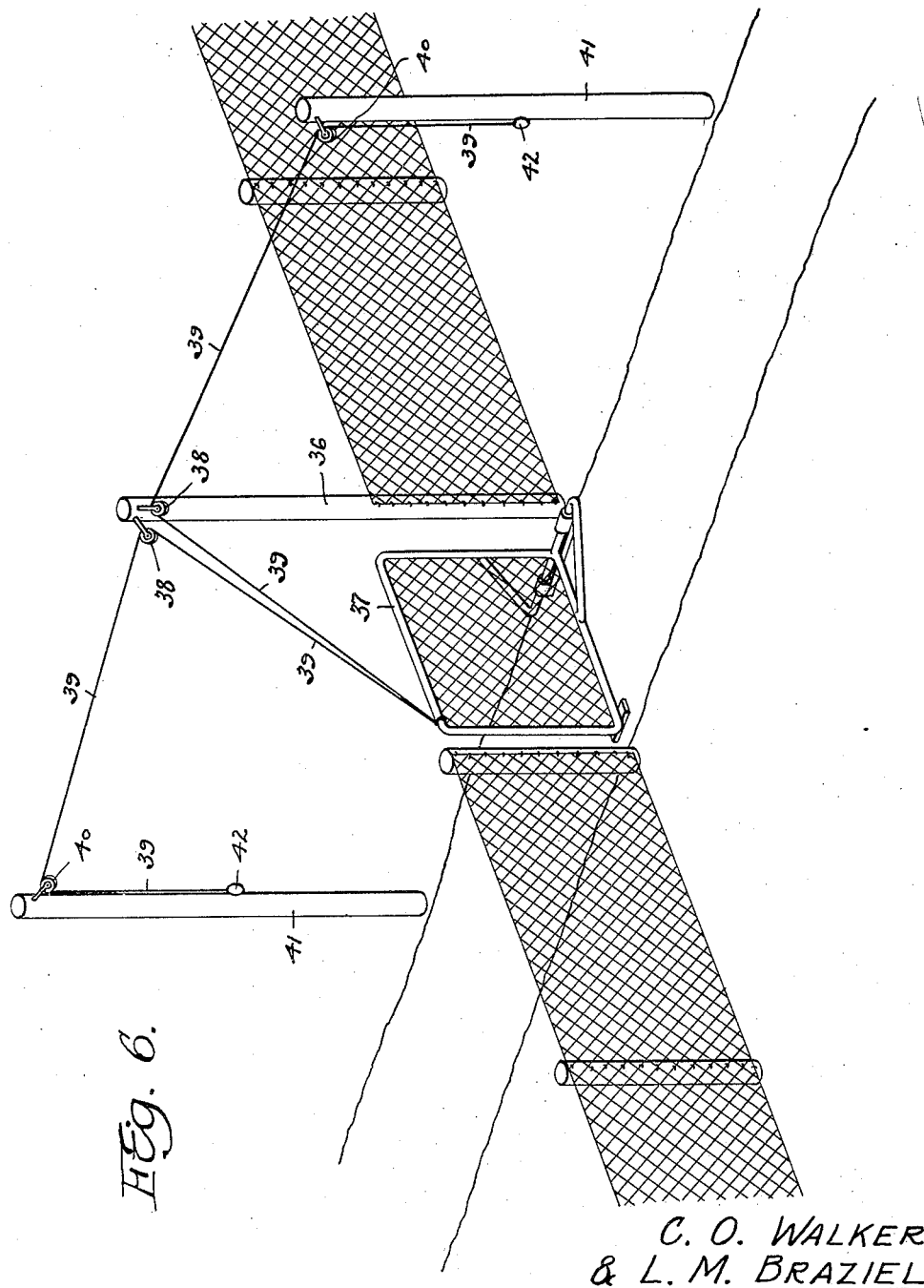

March 29, 1932.  C. O. WALKER ET AL  1,851,472
ALL PURPOSE GATE
Filed Dec. 10, 1930  6 Sheets-Sheet 5
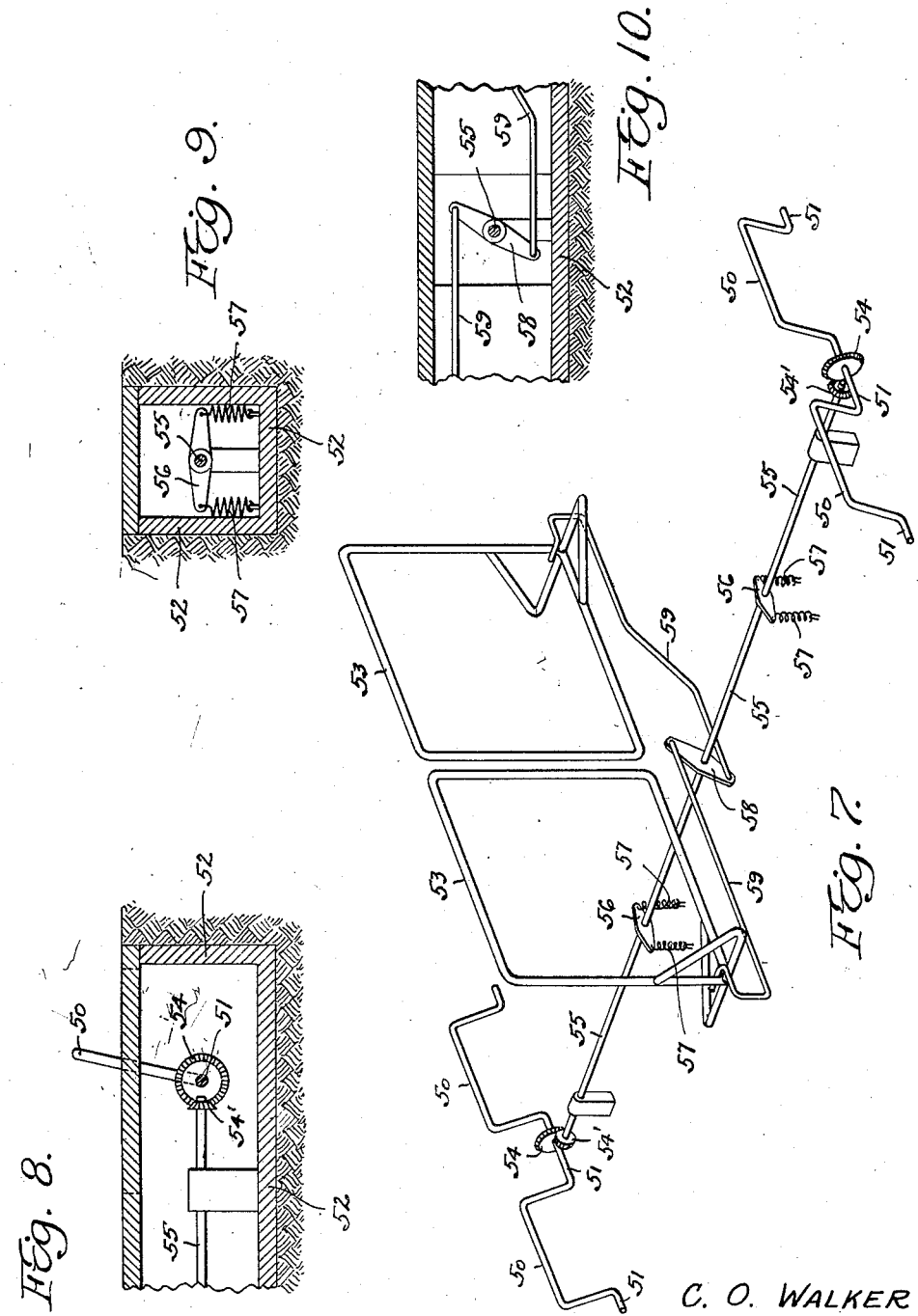
C. O. WALKER
& L. M. BRAZIEL
INVENTORS March 29, 1932.    C. O. WALKER ET AL    1,851,472
ALL PURPOSE GATE
Filed Dec. 10, 1930    6 Sheets-Sheet 6
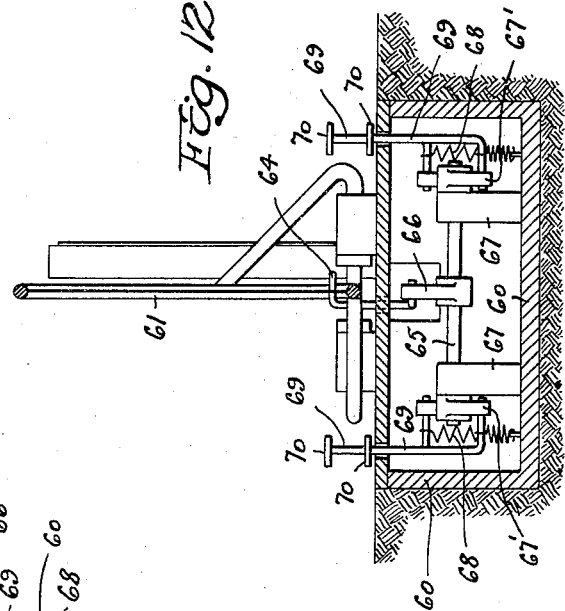
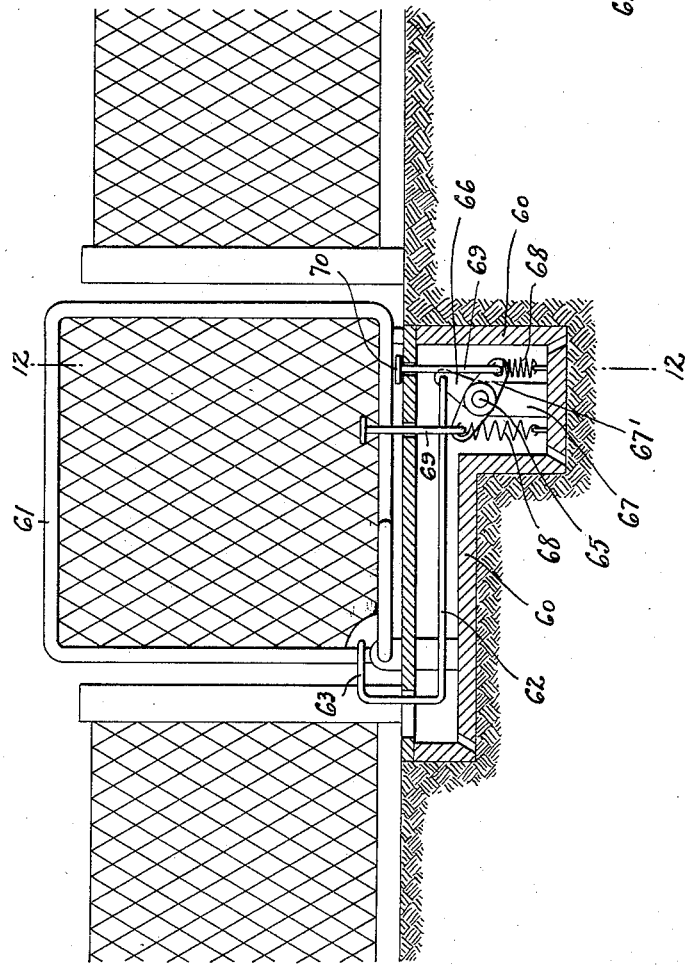
C. O. WALKER
& L. M. BRAZIEL
INVENTORS
BY *Victor J. Evans*
ATTORNEY
WITNESS:

Patented Mar. 29, 1932

1,851,472

UNITED STATES PATENT OFFICE

CHARLES O. WALKER AND LEVI M. BRAZIEL, OF BENT, NEW MEXICO

ALL PURPOSE GATE

Application filed December 10, 1930. Serial No. 501,363.

Our present invention has reference to a gate construction and operating means therefor, and our general object is the provision of a gate, which may be employed at any place where a barrier is desired, and which may be operated either by a vehicle or by hand to impart a partial swinging to the gate to bring the same beyond its center of gravity to permit the said gate swinging or gravitating to either of its open or closed position and further wherein the gate when approached from one direction is opened and after the pedestrian or vehicle passes the gate mechanism will be operated to return the gate to its closed condition.

A further object is the provision of a gate and operating mechanism therefor, in which no hinges for the gate are required, in which the gate is held from sagging, prevented from opening by wind or the like, and which shall be of a comparatively simple construction that is positive in operation.

To the attainment of the foregoing the invention further consists in the novel features of construction, association and operation of parts hereinafter described and definitely claimed.

In the drawings:

Figure 1 is a top plan view of a gate in accordance with this invention.

Figure 2 is a similar view with the gates removed and the top plate for the substantially cross-shaped housing also removed.

Figure 3 is a sectional view approximately on the line 3—3 of Figure 1.

Figure 4 is a similar sectional view but showing the gates open.

Figure 5 is a detail sectional view approximately on the line 5—5 of Figure 1.

Figure 6 is a perspective view to illustrate the manner in which the gate may be hand operated.

Figure 7 is a perspective view illustrating diagrammatically the manner in which the gates are operated by the wheels of a vehicle.

Figure 8 is a detail sectional view taken through one end of the casing.

Figure 9 is a transverse sectional view to illustrate the compensating springs secured on the ends of the rocker arm that is centrally fixed to the throw rod.

Figure 10 is a sectional view through a portion of the casing and throw rod to better illustrate the throw lever and the gate operating rods which are pivoted thereto.

Figure 11 is a side elevation of a foot pedal operated gate throwing mechanism, the ground casing being in section.

Figure 12 is a sectional view approximately on the line 12—12 of Figure 11.

As previously stated our improved gate may be used in any place where a barrier is desired, for instance, as a cattle guard, road gate, farm gate, poultry gate, forest trail gate, etc.

In Figures 1 to 5 of the drawings we have illustrated the improvement as a gate or barrier for highways and in this showing we embed in the roadway a substantially cross-shaped box or casing which may be constructed of any desired material, but which is preferably formed of either metal or concrete. The longitudinal branches of the casing are arranged centrally in the roadway 1, and the lateral branches are arranged transversely of the roadway. The center of the casing 2, at the juncture of its longitudinal and lateral branches, is enlarged, as disclosed by the drawings and the said casing is normally closed by a top plate 3 of a shape corresponding to that of the casing.

In the enlarged central portion of the casing we arrange a longitudinally extending plate in the nature of a slide 4. The slide is suitably guided for longitudinal movement and is held from lateral or swinging movement. The slide, from one of its ends, is centrally slotted or bifurcated, as at 5, and through the slot there is passed a pin 6 that affords a pivot for the oppositely directed angularly disposed links 7 of toggle levers. In addition to this the pin 6 passes through a central opening in a rocker arm 8. The second links 9 of the toggle levers are pivoted, as at 10, to the slide 4, and the pivot 10 also connects thereto one end of an arm or link 11 whose second end is pivoted to one end of the rocker arm 8.

Pivotally secured to the free end of the rocker arm 8 and extending through one of the longitudinal branches of the casing 2 there is a throw rod 12. This rod has its outer end offset or arranged at an angle, as indicated by the numeral 13, and the said end 13 passes through an opening in an arm 14 that is fixed on and extends at an upward angle from the center of a crank shaft 15. The shaft has its central straight portion journaled in suitable bearings and its ends are journaled in bearing openings in the ends of the outer lateral branch of the casing 2. Fixed to the angle end 13 of the throw rod 12 and to the bottom of the casing there are oppositely directed coiled compensating springs 16, respectively.

The shaft 15 has two cranked portions, and the arms at the ends of the said cranked portions pass through elongated slots or openings in the top 3 for the casing, and each of the cranked portions of the shaft is designed to be contacted by the wheels of the vehicle to turn the shaft and exert a longitudinal movement to the throw rod 12 to operate the gates in a manner which will presently be apparent.

The slide 4 has its non-slotted or outer end connected to a second throw rod 17, the same having an angle or finger end 17', that is received through an arm 14' fixed on the central straight portion of the crank shaft 18. The finger 17' has secured thereto the ends of oppositely arranged angularly disposed coil compensating springs 16', the second ends of the springs being secured in the bottom of the casing 2. The shaft 18 has two cranked portions 18' whose angle sides or arms pass through elongated slots in the second end of the cover 3 and are also designed to be contacted by the wheels of the vehicle for operating the gate, or rather, for imparting an initial throw to the gate. For distinction the cranked ends of the shaft 15 are indicated by the numeral 15'.

To the pivots 19 that connect the oppositely disposed and angularly related links 7 and 9 of the toggle levers there are secured rods 20 that are passed through the lateral branches of the casing and are suitably guided therethrough to hold the same from swinging or lateral movement. The rods 20 have their outer or free ends bent upwardly, as at 21, and extended through elongated openings 22 in the cover plate 3. The angle ends 21 of the rods have their outer portions extended inwardly, as at 23, and from thence laterally, as at 24. The rods 20 are in the nature of actuating members for the gate and the offset or angle ends 24 thereof are in the nature of kicker elements for the said gate as will be presently apparent.

The kicker elements 24 on the ends of the actuating rods are disposed inwardly with respect to the sides or edges of the roadway 1, and the cover plate 3, at the slotted ends thereof is provided with lateral extensions 25 that have secured thereon two-part bearings 26 for a shaft 25' that is formed with and extends laterally from the inner and lower corners of the gate frames 27, respectively. It is to be noted that in this construction two gates are employed. The normally vertical and inner rails of the gate frames are for distinction indicated by the numeral 28 and the normally lower rails of the gate frame, are indicated for distinction by the numeral 29. The frames 27 are suitably covered by wires or the like and the rails 28 are disposed opposite but slightly out of alinement with the fence posts 30. The offset end or kicker elements 21 on the actuating rods 20 are arranged between the rails 28 and 29 of the gate frames at the lower corners thereof so that the said kicker members may contact with either the rail 28 or the rail 29 when the actuating rods 20 are imparted a longitudinal movement in a manner which will presently be described.

In order to brace the rails 28 and 29 and to likewise add weight to the pivoted corners thereof the ends of the shafts 25' are bent at opposite angles, as at 31 and 32, and the ends of the said bent portions are welded or otherwise connected to the opposite faces of the rails 29 and 28 of the gate frames 27.

In order to relieve the gates from undue shock when the same are swung to open or closed position we arrange on the center of the cover plate 3 an abutment strip 33 and inner abutment strips 34 arranged a suitable distance inward of the sides of the roadway.

In operation we will suppose that the gates are closed and a vehicle approaches the said gates in the direction of the arrow in Figure 1 of the drawings. The wheels of the vehicle will engage with one pair of cranks on one of the crank shafts and thus swing the shaft in one direction. This will impart a longitudinal movement to one of the throw rods 12 or 17, causing the same to, say, impart a longitudinal movement to the slide 4. Such movement will cause the toggle levers provided by the links 7 and 9 to expand or swing outwardly from the slide 4, and such movement will also cause the link 11 to move longitudinally and swing the rocker arm 8 to draw upon the second throw rod 12 to swing the second contact lever against the tension of the compensating springs 16. The spread toggle levers will impart opposite longitudinal movements to the actuating rods 20, causing the keeper elements 23 to engage with the end rails 28 of the gates 27 and swing the said gates on their shafts or pivots 25' to partially raise the said gates and arrange the same beyond their center of gravity so that the gates will from thence gravitate or automatically swing to open position. As the vehicle travels on, the axle thereof will engage with the second crank shaft, reversing the operation just described, so that the second throw rod, say the rod 12, will swing the rocker arm to a second position to cause the toggle levers to swing toward each other and thereby move the actuating rods 20 inwardly with respect to the casing 2. Such movement will cause the kicker elements 24 to contact with the rails 29 of the gates 27 to partly swing the said gates and arrange the same beyond the center of their gravity and from thence swing to closed position and into engagement with the compressible abutment member 33.

The brace members 31 and 32 add to the weight of the pivoted corners of the gates as well as reinforcing elements for the gate frames and these members 31 and 32, materially assist the gates in gravitating to their opened and closed position and likewise tend to sustain the said gates in either of their said open or closed positions. In addition to this the brace members prevent the sagging or wobbling of the gate frames, and it will be apparent that the gates cannot be opened by direct pressure thereagainst and cannot be swung either open or closed by such movements. It will also be apparent that with our construction no springs are employed except the compensating springs 16 for the contact levers 13, and that the parts constituting the improvement are strong and durable and are not liable to breakage or disarrangement. The cover plate 3, of course, is removed so that access to the parts arranged in the casing may be had. The cross-shaped casing is provided with spaced apertures 35 that afford drain outlets so that water will not accumulate in the casing.

As disclosed by Figure 6 of the drawings the device may be operated by hand. In this instance a single gate frame is employed and the construction thereof is similar to that previously described. One of the end fence posts, indicated by the numeral 36, is of a greater length than the remaining fence posts and this elongated post 36 is arranged opposite the pivoted or shaft corner of the gate frame 37. The post 36 has secured thereon, adjacent to its top yieldably supported sheave wheels 38 that provide guides for cables 39, respectively, the ends of which are secured to the top bar or rail of the gate frame 37. The flexible elements are extended in opposite directions from the posts 36 and trained over grooved or sheave wheels 40 supported on posts 41 arranged on the opposite sides of the posts 36. The ends of the cables 39 have attached thereto handles 42 whereby a person approaching the gate from either direction may exert a pull upon one of the cables 39 to swing the gate to say open position, and after passing through the gate the handle on the end of the second cable is grasped to cause the gate to return to its closed position. Of course, the pull on the cables is only sufficient to cause the gates 37 to swing beyond their center of gravity when they will automatically swing to either its closed or open position.

Figures 7 to 10 illustrate a slight modification. In these views the wheels of vehicles contact with the crank portions 50 of shafts 51 which are journaled in suitable bearings at the ends of the ground casing 52. The crank shafts 51 are, of course, located a suitable distance away from and at the opposite sides of the gates 53. The gates and the actuating rods therefor are of a construction similar to that previously described so that a detail description of these elements will not be attempted.

On the center of each of the shafts 51 there is secured a beveled gear 54 which is in mesh with a pinion 54'. The pinions 54' are fixed on the ends of the throw rod or shaft 55 and the said throw rod has secured thereon a pair of spaced laterally extending arms or levers 56. To the ends of each of the levers 56 and to the bottom of the casing 52 there are secured the compensating springs 57. The rod 55 has fixed thereon a rocker arm 58 to whose ends the actuating rods 59 are loosely or pivotally connected. Each shaft 51 is provided with a pair of cranks 50 and it will be obvious that a vehicle approaching the gates in either direction will have its wheels contact with the cranks 50 and one of the shafts 51 to cause the turning of the throw rod or shaft 55 (which, of course, is journaled in suitable bearings) to swing the rocker arm 58 to impart a longitudinal movement to the rods 59 and thereby swing the gates to either open or closed position in a manner heretofore described.

In Figures 11 and 12 we have illustrated means whereby a single gate may be swung to either open or closed position by foot pedal means. The operating means is arranged in a suitable ground casing 60, while the gate frame 61 and the actuating rod 62 only slightly differ from the construction previously described. In this arrangement the upper offset or angle end 63 of the rod 62 has its end formed with a lateral extension 64 in the path of contact with either the normally vertical or lower normally horizontal arm of the gate frame in accordance with the push or the pull or more strictly speaking the longitudinal movement of the actuating rod in two directions to open or close the gate. The gate is mounted in a manner as heretofore described and has its shaft provided with the offset brace for the gate frame. In the casing 60 there is journaled in suitable bearings a shaft 65, the said shaft having secured thereon a finger member 66 to which the inner end of the rod 62 is pivoted. The shaft, outward of its bearings 67, and at the opposite sides of the gate frame 61 has fixed thereto rocker arms 67', the ends of the said rocker arms having secured thereto compensating springs 68 which are also secured to the bottom of the casing 60. The said ends of the rods or shafts 67' have also fixed thereon outwardly directed rods 69, respectively, the outer ends of the said rods being provided with heads 70, respectively, and these rods and heads afford foot pedals. Obviously by depressing one of the pedals the rocker arm or lever 67' will be swung to cause the turning of the shaft 65, so that the finger 66 will exert a drawing or a pushing action against the rod 62, and consequently swing the gate to either its open or closed positions in the same manner as heretofore described. One of the pedals on each side of the gate is employed for opening the gate and the other for closing the gate as will be apparent.

It is believed the foregoing description when read in connection with the accompanying drawings will fully set forth the construction and advantages of the invention without further detailed description but obviously we do not wish to be restricted to the precise construction herein shown and described and, therefore, hold ourselves entitled to make such changes therefrom as fairly fall within the scope of what we claim.

Having described the invention, we claim:

1. A gate frame having a laterally extending shaft at one of its lower corners, bearings for the shaft, rightangularly arranged weighted brace means between the ends of the shaft and the stiles of the gate frame, an actuating rod disposed for longitudinal reciprocatory movement and having an offset and angle end that passes through the gate frame adjacent to the shaft and affords a kicker member and designed when the rod is moved longitudinally to impart a kicking action against the rails of the gate rightangularly with respect to the shaft for swinging the gate beyond its center of gravity to permit of the said gate to gravitate to either open or closed position, and means for imparting a reciprocatory movement to the rod.

2. A gate frame having a laterally extending shaft at one of its lower corners, bearings for the shaft, rightangularly arranged weighted brace means between the ends of the shaft and the stiles of the gate frame, an actuating rod disposed for longitudinal reciprocatory movement and having an offset and angle end that passes through the gate frame adjacent to the shaft and affords a kicker member designed when the rod is moved longitudinally to impart a kicking action against the rails of the gate rightangularly with respect to the shaft for swinging the gate beyond its center of gravity to permit said gate to gravitate to either open or closed position, and means for imparting a reciprocatory movement to the rod, said means including toggle levers to which the rod is pivoted, a slide to which one of the toggle levers is pivoted, said slide having a slot, a pivot for the second toggle lever passing through the slot, a rocker arm centrally mounted on the pivot, a link connection between said rocker arm and the pivot of the first link of the toggle lever, operating rods pivotally secured respectively to the slide and rocker arm, a pivotally supported contact lever to which the ends of the rods are connected and oppositely directed compensating springs for the contact levers.

In testimony whereof we affix our signatures.

CHARLES O. WALKER.
LEVI M. BRAZIEL.